(12) United States Patent
Russell, Jr.

(10) Patent No.: US 7,900,949 B1
(45) Date of Patent: Mar. 8, 2011

(54) TRAILER HITCH LOADER

(76) Inventor: Wayne B. Russell, Jr., Spokane, WA (US)

(*) Notice: Subject to any disclaimer, the term of this patent is extended or adjusted under 35 U.S.C. 154(b) by 0 days.

(21) Appl. No.: 12/754,568

(22) Filed: Apr. 5, 2010

(51) Int. Cl.
*B60D 1/36* (2006.01)
(52) U.S. Cl. .......... 280/477; 280/504; 280/508; 280/510
(58) Field of Classification Search .................. 280/477, 280/504, 508, 510
See application file for complete search history.

(56) References Cited

U.S. PATENT DOCUMENTS

| | | | | |
|---|---|---|---|---|
| 5,503,422 A | * | 4/1996 | Austin | 280/477 |
| 5,758,893 A | * | 6/1998 | Schultz | 280/477 |
| 5,909,892 A | * | 6/1999 | Richardson | 280/477 |
| 2002/0145268 A1 | * | 10/2002 | Zechbauer | 280/477 |
| 2006/0076755 A1 | * | 4/2006 | Bergeron | 280/509 |

* cited by examiner

*Primary Examiner* — Paul N Dickson
*Assistant Examiner* — Marlon A Arce
(74) *Attorney, Agent, or Firm* — John Chandler Meline (57) ABSTRACT

Described is a system, device and method for coupling of a towing vehicle to a trailer or other towed item. A skid plate provides a surface on which a tongue of the towed item slides toward alignment over a hitch such as a hitch ball or pintle hook. The tongue, when approaching the correct location, impacts a latch. Movement of the latch facilitates movement of the skid plate downward, out of the way of the tongue. The skid plate automatically drops or tilts below the level of the hitch. The tongue of the trailer then drops onto, engages, or couples to the hitch.

10 Claims, 9 Drawing Sheets

FIG. 2E

TRAILER HITCH LOADER

The present invention relates generally to systems, devices and methods for hitching a trailer to a towing vehicle, and more particularly to a device that facilitates the coupling of a trailer tongue to a hitch of a towing vehicle by a tow vehicle operator and with little or no manual intervention to lower or otherwise couple the trailer tongue to the hitch.

BACKGROUND

Trucks and other towing vehicles are commonly used to pull trailers, boats, vehicles and other towed items. One common problem is the lack of visual or other feedback when directing a towing vehicle toward a tongue of the towed item. For example, it is often not possible to see a hitch ball located on the rear frame of the towing vehicle or the tongue of a trailer. Therefore, as a tow vehicle driver is attempting to connect the trailer with the hitch ball, the tow vehicle driver often must go through a trial and error process for aligning the trailer to the hitch ball. The tow vehicle driver often has to approximate the alignment of the trailer to the hitch ball and approximate the distance between the trailer and the tow vehicle. Such a process requires the tow vehicle driver to intermittently leave the driving position in the tow vehicle to see when the hitch ball is in the correct position with respect to the trailer so that the trailer will connect with the hitch ball.

Previous designs have attempted to aid a tow vehicle driver in hitching a trailer to a hitch ball or pintle hook attached to a vehicle. However, previous designs offer no mechanism to lower or couple the tongue of the trailer to the hitch ball. Many prior designs are overly complex or have overly elaborate assemblies that are prone to corrosion or other failure. Other designs are difficult to properly use with a conventional towing trailer.

SUMMARY

This Summary introduces a selection of concepts in a simplified form that are further described below in the Detailed Description. This Summary is not intended to identify key or essential features of the claimed subject matter, nor is it intended to be used to limit the scope of the claimed subject matter.

One aspect of the present invention provides a system, device and method for facilitating the coupling of a hitch of a towing vehicle with a tongue of a towed item such as the towing vehicle approaches the towed item or as the towed item approaches the towing vehicle. No human or manual intervention is required for the coupling once the invention is initialized for use.

Another aspect of the present invention provides a surface on which a tongue of the towed item slides toward alignment over a hitch such as a hitch ball or pintle hook. The tongue, when approaching the correct location, engages a latch. Operation of the latch facilitates movement of the skid plate downward which causes the tongue to drop onto the hitch.

These and other aspects of the invention are described further in the Detailed Description.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter, as well as a preferred mode of use, are best understood by reference to the following Detailed Description of illustrative implementations when read in conjunction with the accompanying drawings, wherein:

DETAILED DESCRIPTION

While the invention is described below with respect to a preferred implementation, other implementations are possible. The concepts disclosed herein apply equally to other devices for coupling a trailer to a towing vehicle by moving the towing vehicle toward the trailer or moving the trailer toward the towing vehicle. Furthermore, the concepts applied herein apply more generally to coupling of vehicles. The invention is described below with reference to the accompanying figures.

Described is a device, system and method for facilitating the coupling of a towing vehicle to a trailer or other towed item. More specifically, in a preferred implementation, a tongue of a trailer is coupled to a hitch of a towing vehicle. Throughout, for sake of simplicity in explanation, reference may be made to a trailer. However, the use of a trailer refers to any towed item.

Figure 1A:
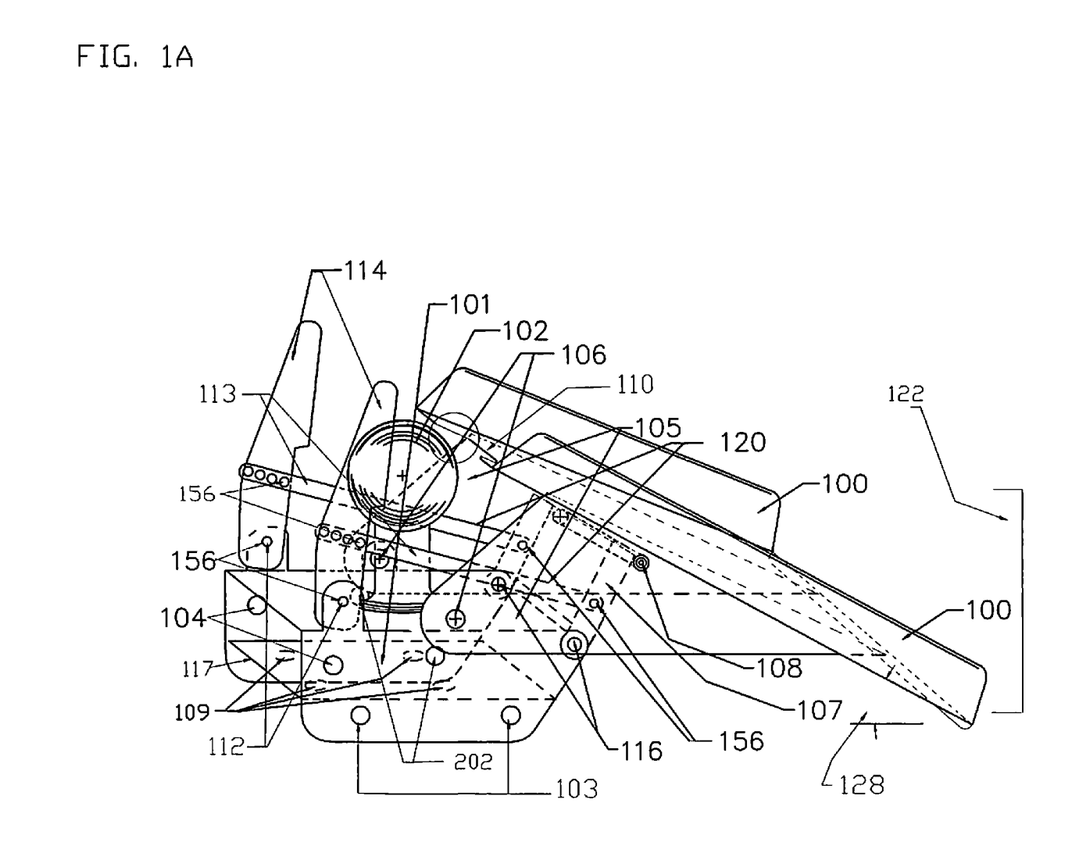
FIG. 1A is a perspective view of a trailer hitch loader according to a first exemplary implementation.

FIG. 1A is a perspective view of a trailer hitch loader according to a first exemplary implementation. With reference to FIG. 1A, a skid plate 100 is movably attached to a sleeve body 101. The skid plate 100 serves as a plane over which a trailer tongue (not shown) slides toward proper alignment over a hitch ball 102 or other connection means.

The sleeve body 101 is attached to a tow bar (not shown) of a tow vehicle (not shown). The sleeve body 101 may be removably or permanently attached to the tow bar. In one implementation, the sleeve body 101 fits fore and aft of the hitch ball 102. The hitch ball 102 can be of any shape, size or material. In one exemplary implementation, the hitch ball 102 is a 2⅝ inch hitch ball. Weld marks 103 show where a bottom plate 117 is connected to the sleeve body 101 such as by welding. Other means may be employed to assemble the components comprising the trailer hitch loader.

Studs or holes 104 in the sleeve body 101 allow for set screws which can be used to align or secure, or align and secure the sleeve body 101 to the tow bar. Instead of or in addition to set screws, other mechanisms may be used to align or secure, or align and secure the sleeve body 101 to the tow bar. Set-screw holes 109 in the bottom plate 117 allow for set-screws (not shown) to be inserted through the bottom plate 117 and against a tow bar (not shown). The set-screws, which pass through the set-screw holes 109, assist the sleeve body 101 to remain in its proper place.

As a trailer tongue (not shown) slides from right to left in FIG. 1A, and along a plane created by the skid plate 100, the trailer tongue impacts one or more arms 114. Two arms 114 are shown in FIG. 1A. Other numbers of arms 114 are possible. Each arm 114 is connected to a link 113 by a hinge pin 156 through an arm hole 112. The arms 114 turn about respective hinge pins 156. A link 113 pulls a corresponding latch 107. In an alternative implementation, a link 113 may be a rod with swivel ends to provide a means of adjusting the resting position of a corresponding arm 114.

In an exemplary implementation, there is a latch 107 on each side of the hitch ball 102. The latches 107 support the skid plate 100. Each latch 107 turns about a hinge pin 156, the hinge pin 156 being inserted through a latch hinge aperture 116. Each latch 107 may be positioned against an optional latch stop bar 108. The latch stop bar 108 helps align the latch or latches 107 under the skid plate 100. Latches 107 are under compression as a trailer tongue exerts a downward force onto the skid plate 100.

During use, when the arms 114 are engaged and rotated (e.g. pushed by a trailer tongue), the weight of the trailer tongue and the weight of the skid plate 100 cause the skid plate 100 to drop downward, out of the way of the trailer tongue. The trailer tongue is then able to drop onto, or otherwise engage, the hitch ball 102. The skid plate 100 is connected to the main hinge pins by legs 105. The legs 105 may be of any shape, size, thickness or geometry. The skid plate 100 turns about an axis defined by main hinge pin apertures 106. Main hinge pins connect the legs 105 to the sleeve body 101 at the main hinge pin apertures 106. Alternatively, depending on the size, configuration or position of the hitch ball 102, the main hinge pins may connect the legs 105 to the sleeve body 101 at alternate main hinge pin apertures 202. In one implementation, the skid plate 100 comprises a notch 110 to accommodate certain models of trailer tongue receiver wherein these certain models comprise a tongue which protrudes below a cup portion of a receiver, the cup portion of the receiver mating to the hitch ball 102.

After the skid plate 100 drops, the skid plate 100 may be secured by a magnet, latch, cord or other means to prevent the skid plate 100 from swinging or otherwise moving when not in use. For example, a circular-shaped magnet (not shown) may be affixed to the bottom plate 117 such as between set-screw holes 109 or other location. In another implementation, the trailer hitch loader may be removed after a towed item is attached to a hitch ball 102. In yet another implementation, the skid plate 100 may be removed after a towed item is attached to a hitch ball 102 leaving the remainder of the trailer hitch loader in place.

The geometry of the components comprising the trailer hitch loader is such that a portion of a towed item (e.g. trailer tongue) is designed to contact a portion of the skid plate 100 when a towing vehicle (not shown) and a towed item (not shown) are brought together. The skid plate 100 offers a vertical range 122 in which contact with the skid plate 100 can be successful. Thus, the trailer hitch and trailer tongue do not have to be identically aligned or coordinated vertically—the vertical range 122 comprises part of the ease of use of the trailer hitch loader.

In a preferred implementation, a top edge of the skid plate 100 is proximal to the top and leading portion of the hitch ball 102. Furthermore, in a preferred implementation, an angle of inclination 128 of the skid plate 100 (as measured from the horizontal) is between approximately 10 and approximately 45 degrees. In one particular implementation the angle of inclination 128 of the skid plate is approximately 28 degrees.

Other implementations of a trailer hitch loader are possible such as varying the number, geometry and arrangement of legs 105, arms 114, links 113 and latches 107. In a preferred embodiment, an axis formed by the main hinge pins 106 is located anywhere on the proximate to towing vehicle side of the hitch ball 102 including under the hitch ball 102. In another embodiment, the axis formed by the main hinge pins 106 is located beneath the top of the hitch ball 102. Also, in a preferred embodiment, there are a plurality of arm holes 112 to accommodate a variety of configurations or shapes of trailer tongues and to accommodate a variety of hitch balls 102, pintle hooks or other connection means. Each arm 114 is positioned and each link 113 is fastened to the corresponding arm 114 so as to allow a particular trailer tongue to couple properly onto a particular hitch ball 102 when the trailer tongue is properly aligned over the particular hitch ball 102.

While embodiments of a trailer hitch loader have been described as being attached to or part of a towing vehicle, a trailer hitch loader alternatively may be attached to or form part of a towed trailer or towed item. For example, the trailer hitch loader may be part of a tongue of a trailer. In such an alternative, the hitch ball 102 or other component of the towing vehicle would impact and slide along a skid plate until the hitch ball 102 and the tongue of the towed item were properly aligned. An arm or other mechanism would be engaged and would facilitate the coupling of the towed vehicle to the towed item. The overall mechanism would be similar to that shown in FIG. 1A.

Figure 1B:
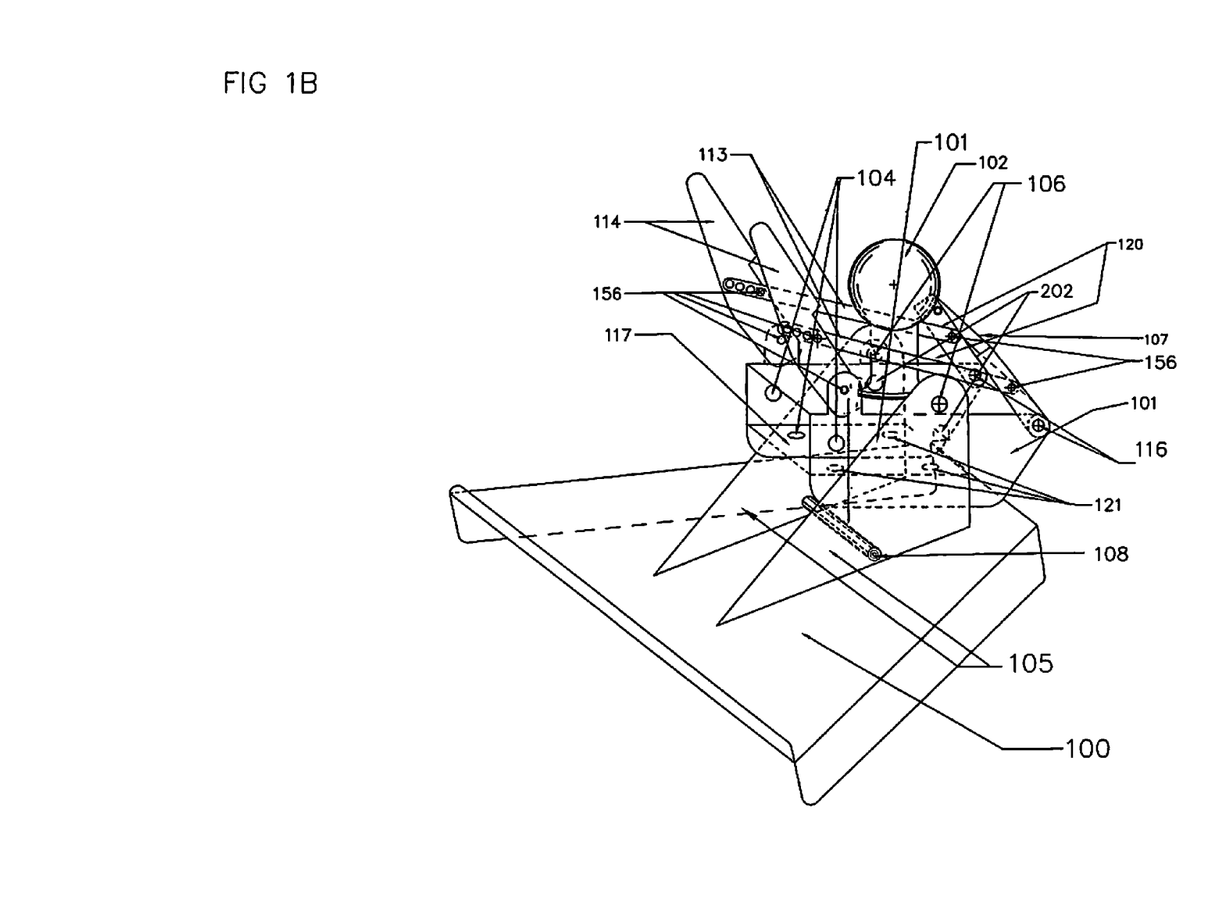
FIG. 1B is a perspective view of a trailer hitch loader shown in FIG. 1A wherein a skid plate and allied parts are rotated to a position somewhat below a ball hitch.

FIG. 1B shows the skid plate 100 of FIG. 1A after the arms 114 have been engaged by a trailer tongue (not shown). With reference to FIG. 1B, the skid plate 100 has rotated about the axis defined by the main hinge pins 106 and has moved to a location generally below the sleeve body 101 and bottom plate 117.

Figure 1C:
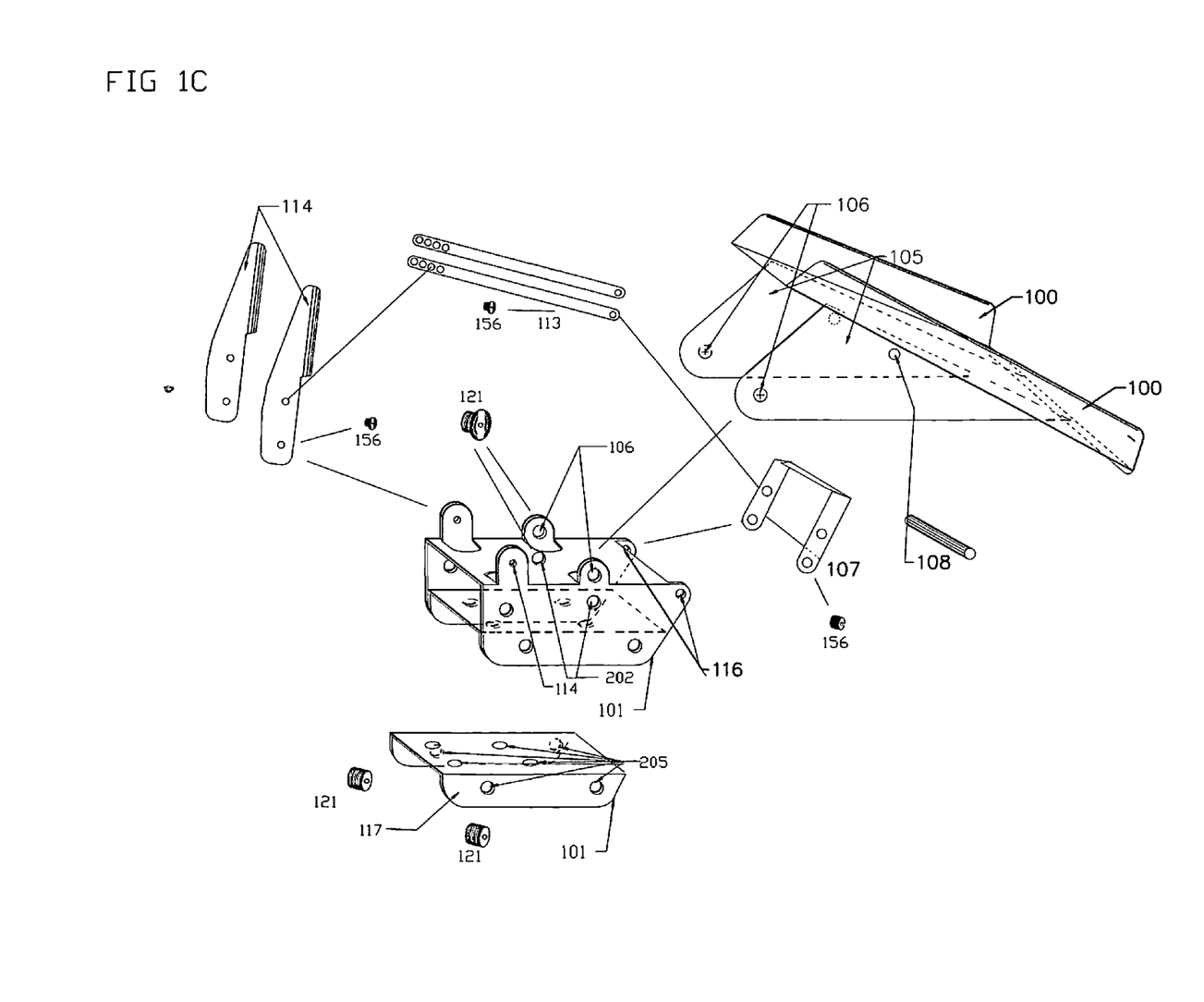
FIG. 1C is an exploded perspective view of trailer hitch loader shown in FIG. 1A.

FIG. 1C is an exploded view of a trailer hitch loader shown in FIG. 1A. With reference to FIG. 1C, a skid plate 100 comprises upturned side guides along the lateral edges of the skid plate 100. In a preferred implementation, the upper portion of the lateral edges of the skid plate 100 are rolled outward, the proximal edge of the skid plate 100 is rolled downward, and the leading edge of each arm is partially rolled to the side. The rolled edges provide an improved surface of contact, increased strength, and provide an improved user experience in working with the trailer hitch loader. In the implementation shown in FIG. 1C, set screws 121 are inserted through apertures 205 in the bottom plate 117 and through apertures in the sleeve body 101.

In one implementation, the sleeve body 101 comprises tabs which are cut from the body of the sleeve body 101 and arranged vertically. The tabs each comprise an aperture either for an arm 114 or for a leg 105 (a main hinge aperture 106). Thus, the thickness of each tab is the same as that of the material used to form the sleeve body 101. In other implementations, the thickness of a tab may be greater than or less than the thickness of the sleeve body 101. One advantage of a greater thickness would be to provide increased strength to the trailer hitch loader.

Further, in a preferred implementation, the width of the proximal edge of the skid plate 100 is greater than the width of the distal edge of the skid plate 100, the edge closest to the hitch ball (the hitch ball is not shown in FIG. 1C). The side guides maintain the trailer tongue on the skid plate 100 when the trailer tongue contacts a lateral edge of the skid plate 100. Thus, the trailer tongue may be guided toward the hitch ball 102 as the tow vehicle is moved toward the trailer tongue or as the trailer tongue is moved toward the tow vehicle. Thus, the skid plate 100 provides a horizontal range (not shown in FIG. 1C) in which to initiate contact between the trailer tongue and the tow vehicle.

Figure 1D:
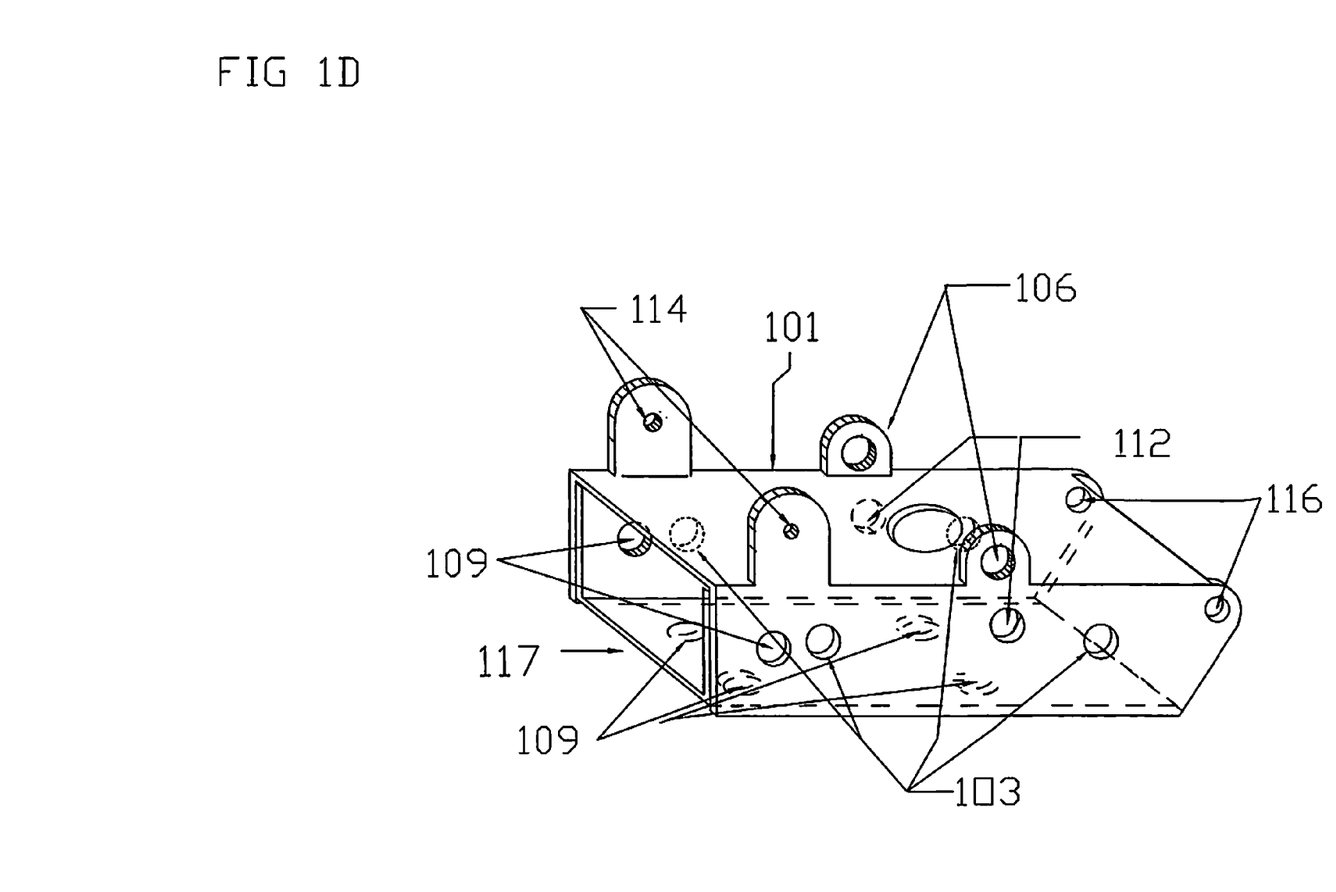
FIG. 1D is a perspective view of a sleeve body and a bottom plate of a trailer hitch loader according to a second exemplary implementation.

FIG. 1D is a perspective view of a sleeve body and a bottom plate of a trailer hitch loader according to a second exemplary implementation of a trailer hitch loader. With reference to FIG. 1D, sides of an alternative bottom plate 217 fit into the sleeve body 101. The alternative bottom plate 217 and the sleeve body 101 comprise weld marks or holes 103, alternative main hinge apertures 112 and latch hinge pin apertures 116.

Figure 2A:
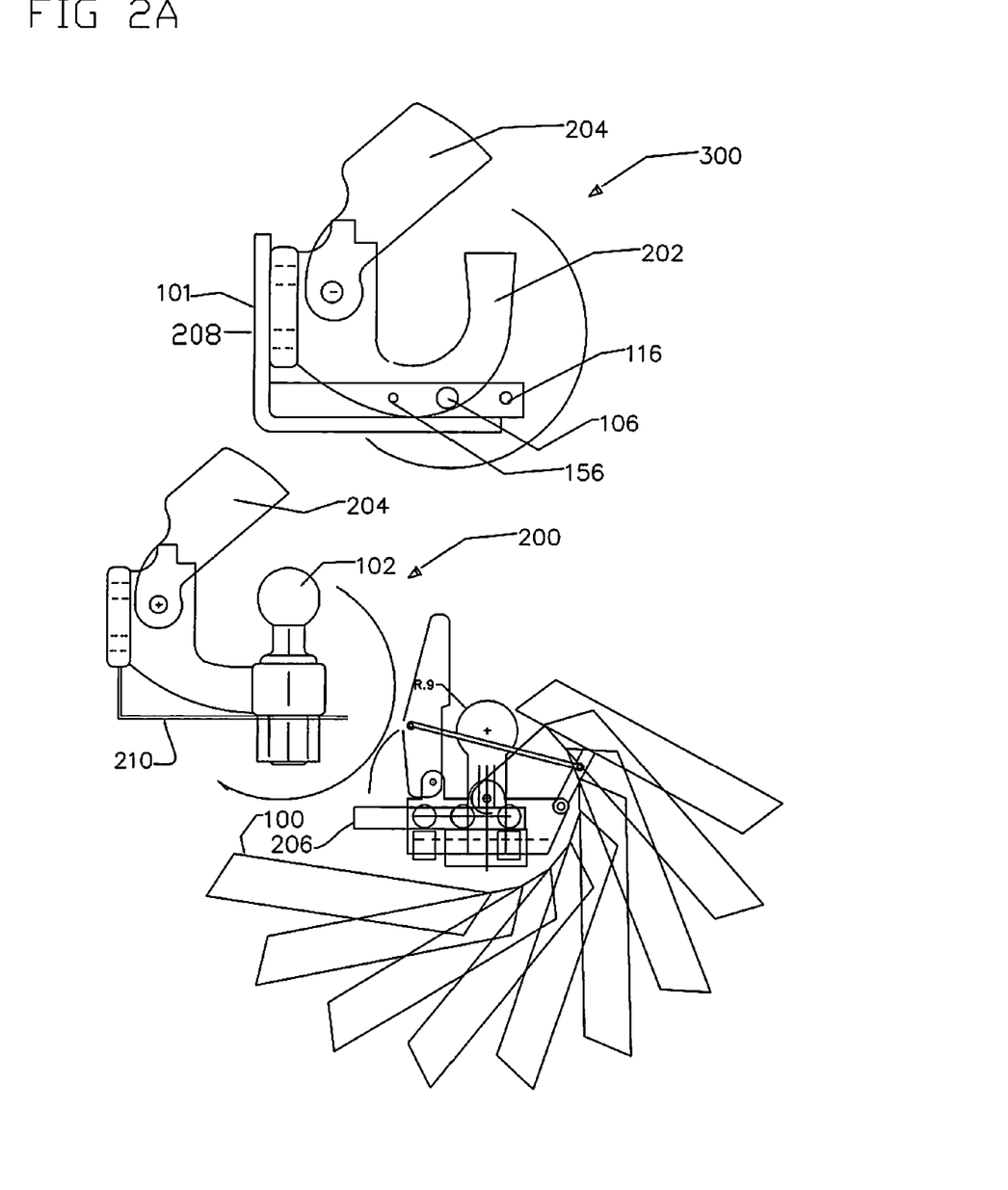
FIG. 2A is a side view of embodiments of pintle hooks and a side view of a trailer hitch loader according to a third exemplary implementation.

FIG. 2A comprises a side view of two varieties of pintle hooks known in the art. Pintle hooks typically support larger or heavier towed items as compared to other coupling mechanisms such as a hitch ball. With reference to FIG. 2A, a first pintle hook 300 comprises a hook or pin 202, a latch or cap 204 that mates to the top of the hook or pin 202, and a horizontal bar or stinger 206. A first pintle hook 200 comprises a relatively heavy bracket 208. A gudgeon or trailer tongue (not shown) is then mated to the hook or pin 202. A trailer hitch loader comprises one or more latch hinge apertures 116 and one or more hinge pins 156.

A second pintle hook 200 comprises a more modest bracket 210 and in lieu of a hook or pin 202, a hitch ball 102 is shown at the end of the pintle hook arm. Instead of a hitch ball 102, other shapes of coupling device may be used. As shown in FIG. 2A, pintle hooks may be mounted vertically. A trailer hitch loader according to the invention described herein may be created so as to function with any kind of tow connection including pintle hooks where a tongue or other part of a towed item drops onto a portion of a towing vehicle. The bottom portion of FIG. 2A shows the motion of a skid plate 100 in relation to a hitch ball 102 and a horizontal bar or stinger 206.

Figure 2B:
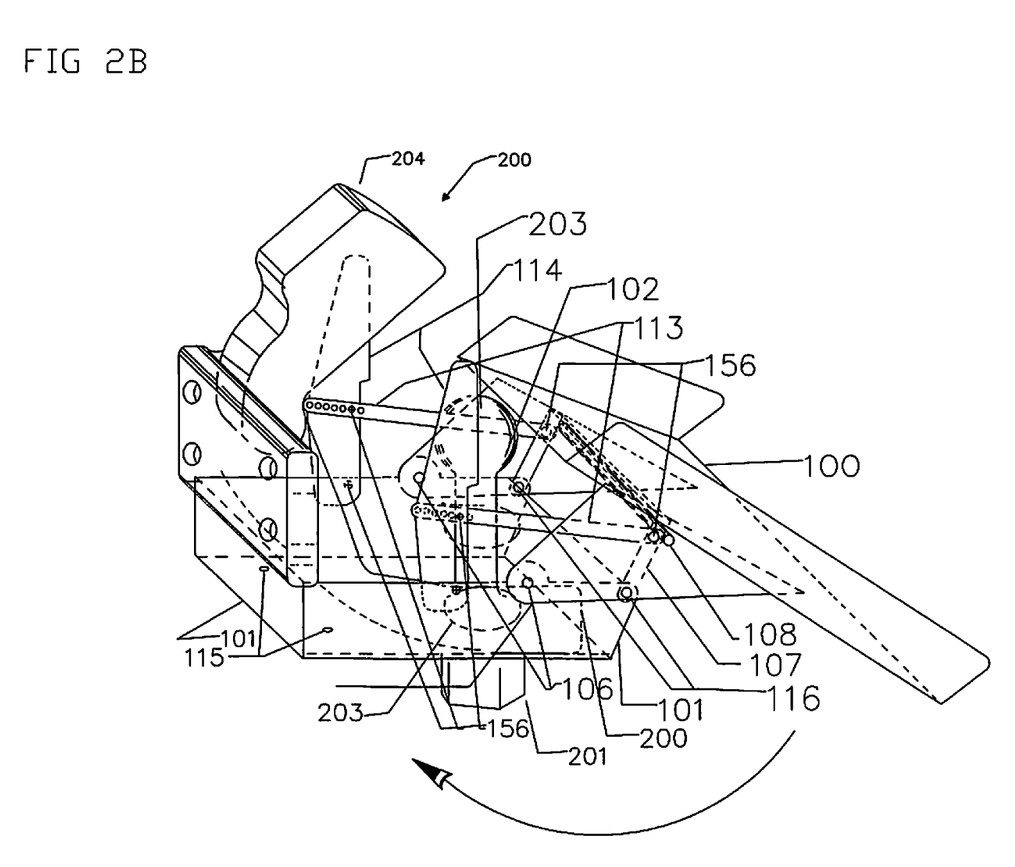
FIG. 2B is a perspective view of a trailer hitch loader according to a third exemplary implementation for use with a pintle hook.

FIG. 2B is a perspective view of a trailer hitch loader according to a third exemplary implementation for use with a pintle hook 200 where the hook or pin is in the form of a hitch ball 102. In this implementation, the trailer hitch loader is mounted vertically between the pintle hook 200 and the towing vehicle (not shown). Alternatively, the trailer hitch loader can be mounted to a horizontal bar or stinger 206. In the implementation shown in FIG. 2B, u-bolt apertures 115 are formed in the bottom portion of the sleeve body 101 or bottom plate. An arrow shows the motion of the skid plate 100 when the latch or latches 107 are disengaged from the skid plate 100. A hitch ball 102 is mounted with a pintle hook nut 201. An aperture 203 is formed in the bottom of the sleeve body 101 or bottom plate so as to accommodate the hitch ball 102 and pintle hook nut 201 or at least accommodate access to the hitch ball 102 and pintle hook nut 201.

Figure 2C:
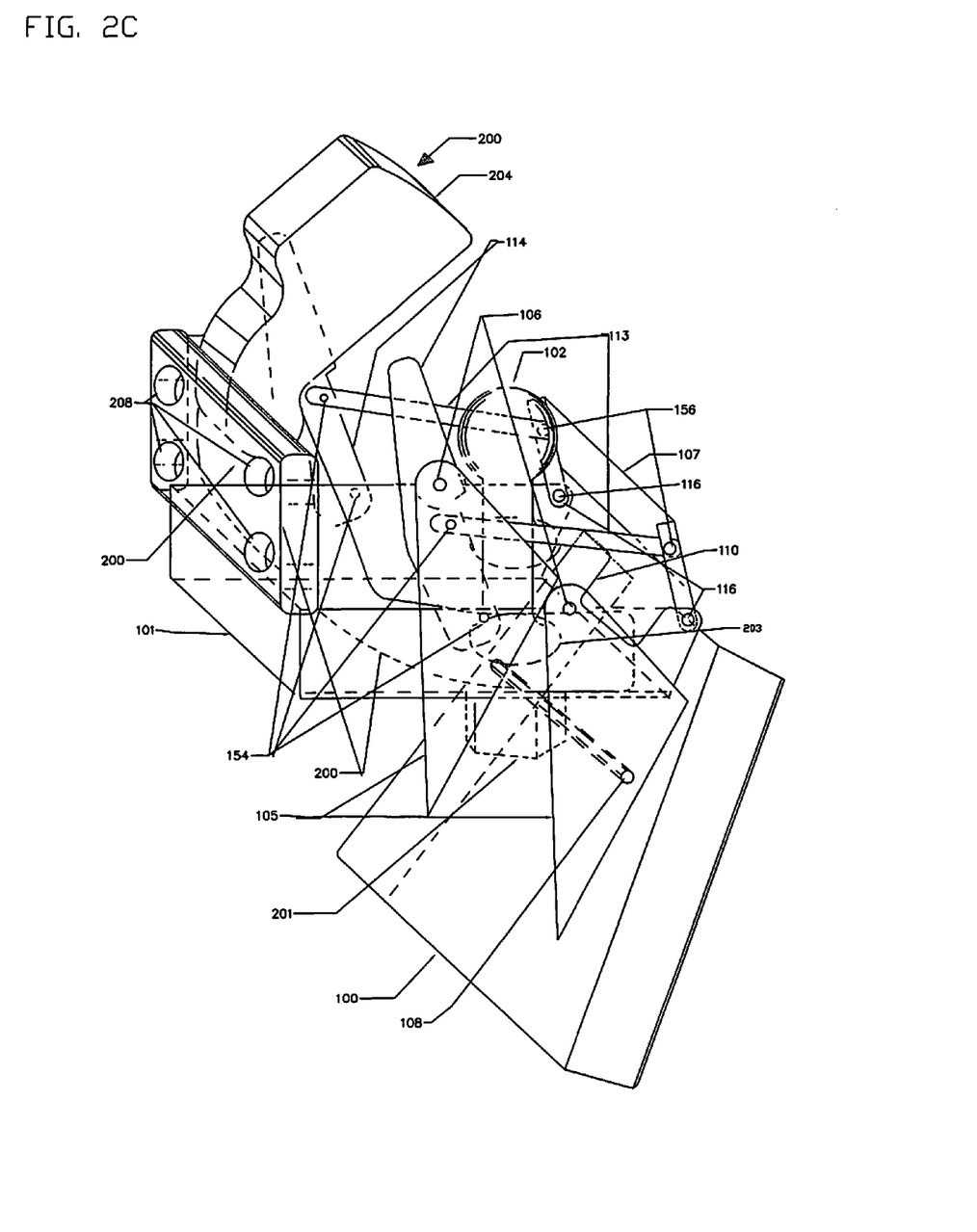
FIG. 2C is a perspective view of a trailer hitch loader shown in FIG. 2B wherein a skid plate is rotated below the pintle hook.

FIG. 2C is a perspective view of a trailer hitch loader shown in FIG. 2B wherein a skid plate 100 is rotated below the pintle hook 200 such as in the situation where a towed item has been coupled to the hitch ball 102. With reference to FIG. 2C, a trailer tongue or other portion of a towed item has impacted and engaged two arms 114. The arms 114 in turn have disengaged the latch or latches 107 from supporting the skid plate 100. The skid plate 100 has come to rest below the hitch ball 102 of the pintle hook 200. In FIG. 2C, cap 204 is shown in an upwardly inclined position. In practice, the cap 204 would rest on top of the tongue (not shown) of a towed item, the tongue coupled to the hitch ball 102 after the trailer hitch loader has been actuated or triggered. Further, in practice, the skid plate 100 would be held up by a cord, latch or other means. In a preferred implementation, the skid plate 100 is held up from impacting a road or other surface by one or more magnets (not shown in FIG. 2C).

Figure 2D:
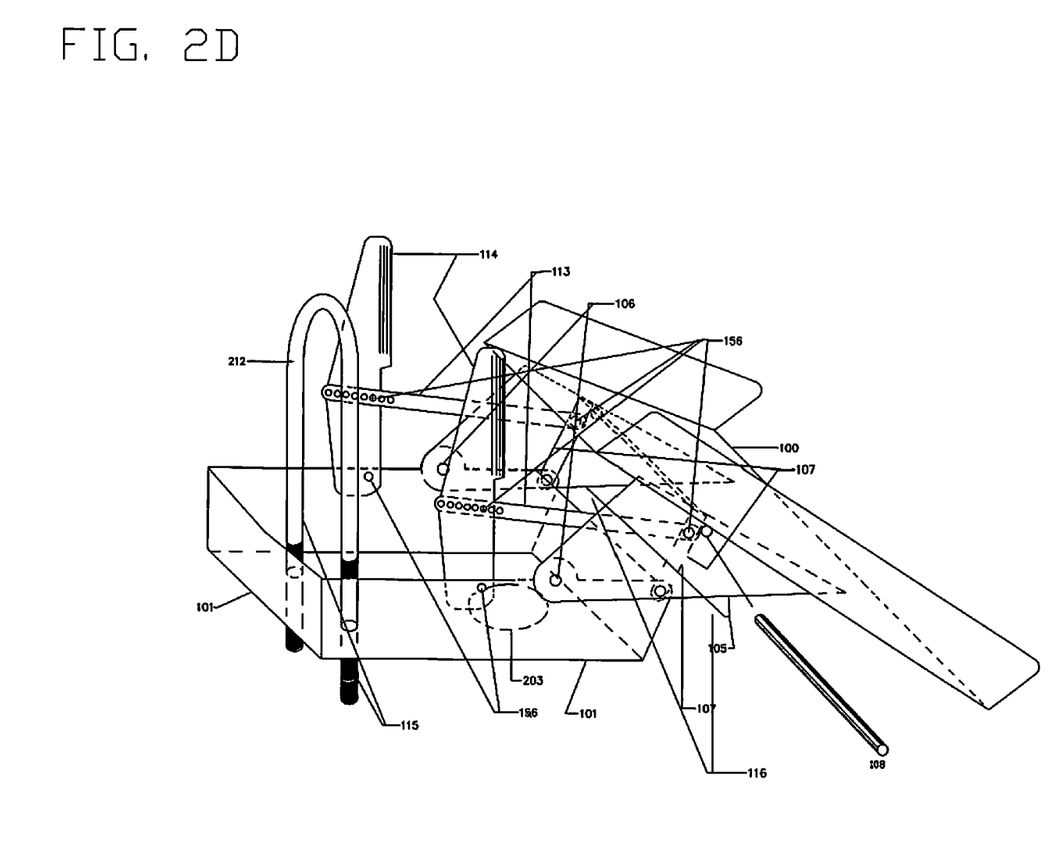
FIG. 2D is a perspective view of a trailer hitch loader shown in FIG. 2B and further comprising a u-bolt.

FIG. 2D is a perspective view of a trailer hitch loader shown in FIG. 2B. The trailer hitch loader comprises a u-bolt 212. The ends of the u-bolt 212 pass through u-bolt apertures 115 in the sleeve body 101 or bottom plate. The u-bolt 212 is fastened tightly to the horizontal bar or stinger 206 (not shown) to provide increased strength to the trailer hitch loader against the weight of a trailer tongue pressing downward against the skid plate 100. Other mechanisms or means may be used in lieu of a u-bolt 212 to provide strength to the trailer hitch loader.

Figure 2E:
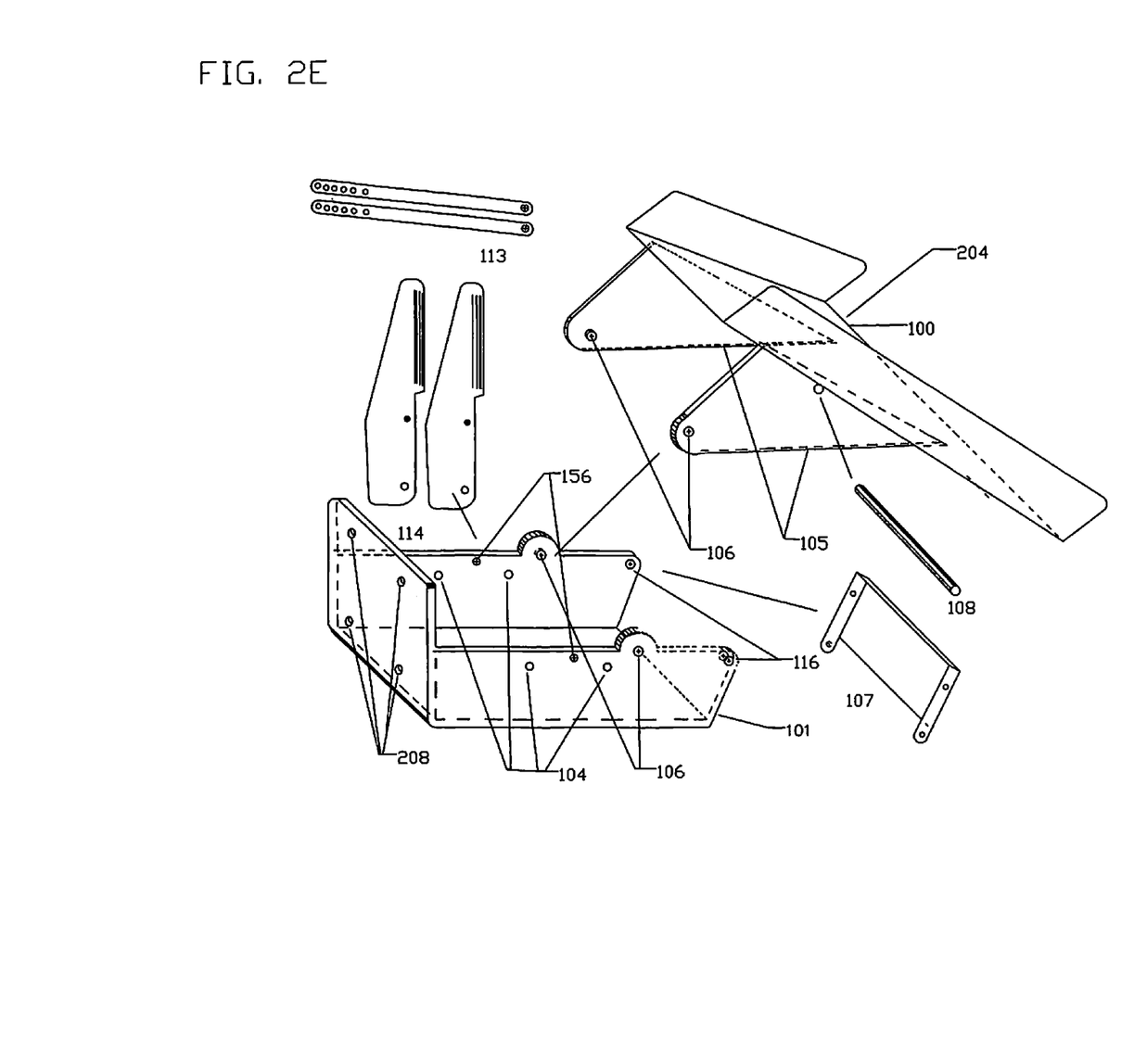
FIG. 2E is an exploded perspective view of a trailer hitch loader showing components comprising a trailer hitch loader such as the one shown in FIG. 2B.

FIG. 2E is an exploded perspective view of a trailer hitch loader shown in FIG. 2B showing the components comprising a trailer hitch loader shown in FIG. 2B minus the pintle hook or hitch ball 203 and cap 204. With reference to FIG. 2E, a leading edge 204 of the skid plate 100 is not rolled downward. Mounting holes are visible in the sleeve body 101. In the implementation shown in FIG. 2E, the latch 107 is a single piece that is attached on each of two sides to a respective link 113. As shown in FIG. 2E, the bottom of the sleeve body 101 may not have any apertures, other than those for mounting of the other components, so as to prevent dirt or other material from soiling or otherwise coating the pintle hook. Thus, the trailer hitch loader may serve other functions and benefits in addition to those of assisting in the coupling of a towing vehicle to a towed item.

The foregoing discussion has been presented for purposes of illustration and description. Various features from one implementation can be combined with other features from other implementations. The description is not intended to limit the invention to the form or forms disclosed herein. Consequently, variation and modification commensurate with the above teachings, within the skill and knowledge of the relevant art, are within the scope of the present invention. The implementations described herein and above are further intended to explain the best mode presently known of practicing the invention and to enable others skilled in the art to use the invention as such, or in other implementations, and with the various modifications required by their particular application or uses of the invention. It is intended that the appended claims be construed to include alternate implementations to the extent permitted.

The invention claimed is:

1. A trailer hitch loader for coupling a towing vehicle to a towed item, the trailer hitch loader comprising:
   a skid plate rotatably mounted to a sleeve body, wherein the sleeve body is removably mountable to a tow bar of the towing vehicle; and
   an arm coupled to a latch, wherein the latch at least partially supports the skid plate when the skid plate is in a receiving position, and wherein the skid plate rotates about an axis of rotation in a direction opposite that of a rotation of the arm when the arm is engaged by a portion of the towed item when coupling the towed vehicle to the towed item, the arm moving the latch from at least partially supporting the skid plate.

2. The trailer hitch coupling apparatus of claim 1 further comprising a guide surface at a proximal edge of the skid plate.

3. The trailer hitch coupling apparatus of claim 1 further comprising a plurality of set screws, wherein each of the plurality of set screws extends through the sleeve body and align the sleeve body with a tow bar.

4. The trailer hitch coupling apparatus of claim 1 wherein the skid plate is tapered, the skid plate being narrower at a distal edge of the skid plate relative to a proximal edge of the skid plate.

5. The trailer hitch coupling apparatus of claim 1 wherein the axis of rotation of the skid plate is located on a proximal side of a hitch of the towing vehicle and an axis of rotation of the latch is located on the distal side of the hitch of the towing vehicle.

6. The trailer hitch coupling apparatus of claim 1 wherein the arm is configured with a mechanism to adjust a resting position of the arm to accommodate a variety of shapes of trailer tongue.

7. The trailer hitch coupling apparatus of claim 6 wherein the mechanism to adjust a resting position of the arm is a plurality of holes.

8. The trailer hitch coupling apparatus of claim 1 wherein the arm is coupled to the latch by a link, wherein the link has a means to adjust a resting position of the arm.

9. The trailer hitch coupling apparatus of claim 1 wherein the latch is movably mounted more distally than an axis of rotation of the skid plate.

10. The trailer hitch coupling apparatus of claim 1 wherein the latch is rotatably mounted more distally than an axis of rotation of the skid plate as measured from the towed item.

* * * * *